Aug. 6, 1946.   A. GOODMAN   2,405,497
OVER AND UNDER SCALE
Filed May 13, 1944
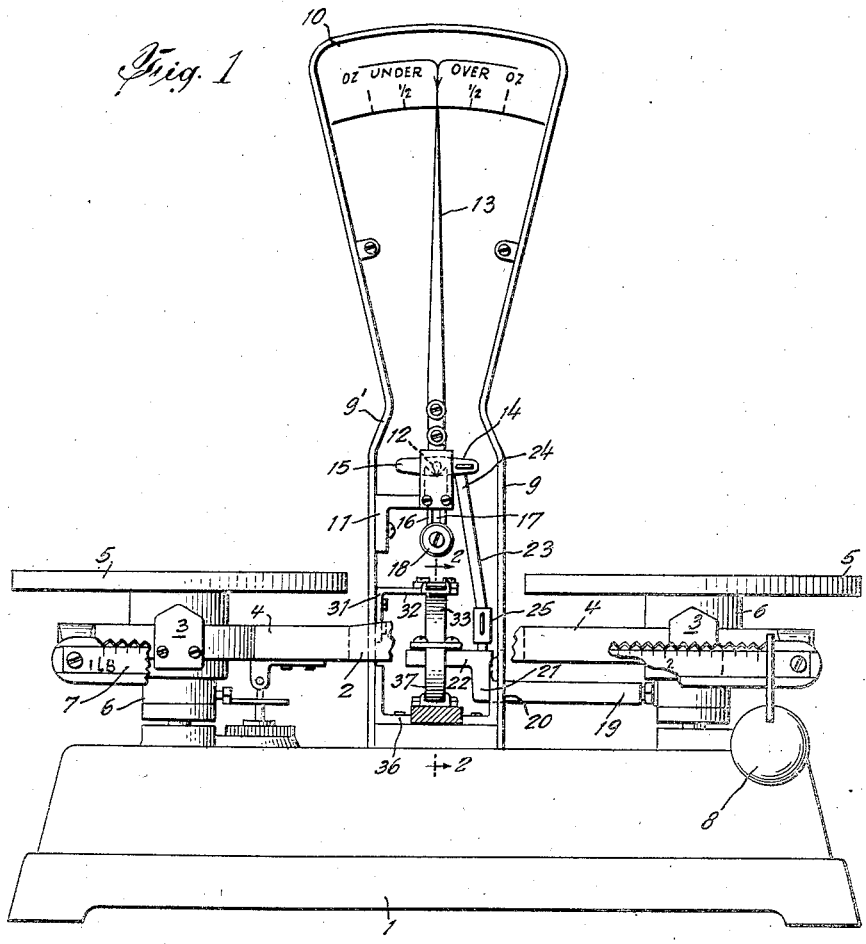
INVENTOR.
ADOLPH GOODMAN
BY
ATTORNEY.

Patented Aug. 6, 1946

2,405,497

UNITED STATES PATENT OFFICE 2,405,497

OVER AND UNDER SCALE

Adolph Goodman, Brooklyn, N. Y.

Application May 13, 1944, Serial No. 535,455

7 Claims. (Cl. 265—54)

The present invention is directed to scales, more particularly to the type known as "over and under" scales, the invention being especially directed to a structure which will allow the indicator or pointer to come to rest very quickly.

Various devices for causing a pointer or indicator to come to rest on a scale of the type contemplated herein have previously been proposed. While some of the structures are capable of causing the pointer to come to rest in a relatively short time, this has been accomplished in most cases with a loss of sensitiveness. In other words, by causing the pointer to come to rest rather quickly, the ability of the scale to measure small variations accurately has been substantially diminished.

The present invention is intended and adapted to provide a structure of a scale wherein the pointer or indicator is adapted to swing over a relatively large area but which will come to rest very quickly after the start of the swinging motion.

It is also among the objects of the present invention to provide a structure which is simple and compact, and in which the elements are so placed that they do not interfere with the functions and operation of the scale.

The scale of the present invention is able to speed up the operations to which a scale of this type is normally put, as for instance in counting and packaging operations. Such scales may also be used for check weighing, balancing, testing, and compounding. They are also capable of providing a structure wherein the platforms or platters may be of various sizes and shapes and in which relatively large platforms are used because of the compactness and small area covered by the operating mechanism of the scale.

In the accompanying drawing, constituting a part hereof and in which like reference characters indicate like parts, Fig. 1 is a front elevational view of a scale made in accordance with the present invention, some parts being omitted and other parts being broken away for clearness;

Fig. 2 is a fragmentary cross-sectional view taken along the line 2—2 of Fig. 1 and showing particularly the position of the S-shaped spring; and Fig. 3 is a fragmentary top elevational view of a fork which is part of the indicator, showing particularly the manner in which the check bar is linked to the indicator.

The scale consists essentially of a base 1 with a horizontal yoke 2 above the base and surrounding casing 9, said yoke being pivoted on a pair of knife edges or pivots at front and back of the yoke to allow the usual oscillating motion of said yoke. Said pivots are not shown and the yoke is partly broken away for clearness. Extending from the yoke and on opposite sides thereof is the lever beam 4. A pair of platforms 5 rest on supports 6, which are pivoted in beam 4 by suitable knife edges contained within cover plates 3. A marked scale 7 is secured to beam 4 and an adjustable weight 8 is supported thereon and is adapted to be moved along said scale.

A casing 9 extends upwardly from the central portion of base 1, having a re-entrant section 9' at the center thereof and a flaring portion above the same terminating in a marked scale 10 at the top of casing 9. Said scale has a zero point and "over" and "under" markings.

Within base 1 is the usual mechanism of scales of this type. Supports 6 extend into the base and they are linked together by various elements, as is well-known.

Just below restricted portion 9' in casing 9 is a bracket 11 which carries knife edge seats which support knife edges 12 on which is hung pointer 13. A fork 14 extends laterally from the indicator 13 in proximity to the bearing support thereof and an extension 15 in the opposite direction provides means for balancing the weight of fork 14 and associated parts. Downwardly projecting extension 16 from indicator 13 has a slot 17 therein and an adjustable weight 18 operating in slot 17 provides means for compensating for the weight of the upper portion of the indicator.

To one of the supports 6 is secured a horizontal arm 19 extending through an opening 20 in casing 9, having an upwardly extending portion 21, and a second horizontal portion 22 terminating at about the center line of the scale.

An indicator actuating bar 23 has its upper end 24 linked into fork 14 and its lower end similarly linked at the junction of members 21 and 22. The linkages are accomplished by means of a U-shaped pin 26 having legs 27 and 27' of unequal length. Fork 14 has on each prong two openings adapted to accommodate the legs of the pin. Leg 27 is curved, as shown in Fig. 3, and the pin is made of spring metal. The end of leg 27 is inserted into one of the openings in the fork, and then the other leg 27' is similarly inserted in the corresponding opening. Then the latter is threaded through an opening in bar 23 and both legs are then inserted into two openings in the other prong of the fork. Because the pin is made of spring metal, it will retain its position against all normal vibration to which the scale may be subjected. At the same time, it may be readily removed for replacement of parts or repairs. The inner faces 28 of the prongs of the fork are curved to provide convex surfaces, thereby allowing considerable lateral movement of bar 23 without binding or interfering with the functioning of the device.

There is provided an S-shaped spring, the central portion 29 of which is clamped to the free end of horizontal bar 22 at point 30. A bracket 31 secured to the inside of the casing has a horizontal portion 32 extending to approximately the center of the scale below indicator 13. The upper end 33 of the ribbon is held in a guide groove 34 and a cover plate 35 secures said end in fixed position. In a bracket 36 at the lower end of the casing the lower end 37 of said torsion ribbon is held in guide groove 38 fitted with a cover plate 39 which clamps the end of said ribbon.

In the operation of the device, the weight of indicator 13 is properly balanced by extension 15 and weight 18. When a weight is placed upon the platform 5 and balance is obtained, there is a very slight vertical movement of the platform and associated parts which is transmitted by bars 19 and 21 to check bar 23, fork 14, to indicator 13. When the scale is in balance, the S-spring is in neutral position with equalized tension. When the scale is unbalanced and arm 19 and indicator 13 are moving, such movement is resisted by both portions of said spring. As a result, usually with one or two swings, the indicator comes completely to rest.

The S-shaped spring is placed in a vertical position so that a plane passing through the same also passes through the knife edges 12 of indicator 13. This gives a suitable balance so that the strain on the apparatus is extremely small. Also, because of this and other factors, the scale itself may be out of level, that is may be placed on an inclined surface and still will function properly as intended.

Because of the relative location of the parts, even if the support on which the scale is placed is subjected to vibrations of moderate intensity, there is no corresponding vibration in the indicator and it comes to rest quickly and accurately. The check bar is relatively short and is within the casing so that it does not constitute any obstacle towards the use of platforms of relatively large area, and it also enables the casing to be made relatively narrow.

The movement or platform 5 and its associated parts is relatively small, and in actual practice may be of the order of one-sixteenth of an inch. In spite of this, the movement of the indicator is in the neighborhood of one inch on each side of the zero point. This means that there is a two inch motion of the pointer for an extremely small movement of the platform, thus giving a very sensitive scale. Because of the small amount of movement of the platform, the wear on the knife edges is greatly diminished and the scale has a much longer life.

There is no torsional strain placed on the S-shaped ribbon, since all of the forces exerted thereon are vertical and there is no tendency for the spring to twist or turn. Because of the character of the spring and its mountings, changes of temperature will affect both the upper and lower portions equally at the same time and variations in length due to temperature changes have no adverse effect upon the functioning of the scale.

The position of the spring is adjustable and adjustments in tension may be very readily accomplished. Also, it is a simple matter to remove the ribbon for the insertion of one of different size or capacity. The assembling of the various elements in the present device is simple and may be readily accomplished by only moderately skilled operators.

Although the invention has been described setting forth a single embodiment thereof, it will be apparent to those skilled in the art that many variations in the details of the operation may be made within the scope of the invention. For instance, the two platforms need not be symmetrically located with respect to the casing, but both may if desired be on the same side of the casing or in any other position. The form, shape and arrangement of the various elements may be changed to a marked degree while retaining the functions attributed thereto. These and other changes may be made without departing from the spirit of the invention, and the latter is to be broadly construed and not to be limited except by the character of the claims appended hereto.

What I claim is:

1. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports and the other end extending to a point below said indicator, an indicator actuating bar pivoted between said other end and said indicator, and a spring of S-shape in a vertical position and having its free ends secured to said base at vertically spaced points, said other end of said arm being fixed to the center of said S between said points, said spring being positioned below said indicator and between said supports.

2. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports and the other end extending to a point below said indicator, an indicator actuating bar pivoted between said other end and said indicator, and a spring of S-shape in a vertical position and having its free ends secured to said base at vertically spaced points, said other end of said arm being fixed to the center of said S between said points, said spring being positioned below said indicator and between said supports, the position of said spring being such that a vertical plane passing through the same also passes through the pivots of said indicator.

3. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports and the other end extending to a point below said indicator, an indicator actuating bar pivoted between said other end and said indicator, and a spring of S-shape in a vertical position and having its free ends secured to said base at vertically spaced points, said other end of said arm being fixed to the center of said S between said points, said spring being positioned below said indicator and between said supports, a casing for said mechanism, said indicator actuating bar being wholly within said casing.

4. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports and the other end extending to a point below said indicator, an indicator actuating bar pivoted between said other end and said indicator, and a spring of S-shape in a vertical position and having its free ends secured to said base at vertically spaced points, said other end of said arm being fixed to the center of said S between said points, said spring being positioned below said indicator and between said supports, the pivot between said bar and said other end being laterally of said spring between the same and one of said platforms.

5. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports and the other end extending to a point below said indicator, an indicator actuating bar pivoted between said other end and said indicator, and a spring of S-shape in a vertical position and having its free ends secured to said base at vertically spaced points, said other end of said arm being fixed to the center of said S between said points, said spring being positioned below said indicator and between said supports, the link between said bar and said indicator being in a fork extending laterally from said indicator.

6. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports, and the other end extending to a point below said indicator, an indicator actuating bar pivoted between said other end and said indicator, and a spring of S-shape in a vertical position, the other end of said arm being fixed to the center of said S, said spring being positioned below said indicator and between said supports, a casing for said mechanism, brackets on said casing, the ends of said spring being secured to said brackets.

7. In a scale having a base, a horizontal lever beam pivoted centrally on said base, platform supports pivotally secured to the free ends of said lever, platforms on said supports, and a weight indicator pivotally mounted on said base centrally between said platforms, the improvement which comprises an arm below said beam having one end secured to one of said supports and the other end extending to a point below said indicator, an indicator actuating bar pivoted between said other end and said indicator, and a spring of S-shape in a vertical position, the other end of said arm being fixed to the center of said S, said spring being positioned below said indicator and between said supports, brackets for the ends of said spring, and guides thereon to hold said torsion against lateral and twisting movement.

ADOLPH GOODMAN.